(12) United States Patent
Sato et al.

(10) Patent No.: US 8,065,482 B2
(45) Date of Patent: Nov. 22, 2011

(54) STORAGE SYSTEM AND METHOD FOR STRIPING DATA

(75) Inventors: Hideaki Sato, Kanagawa (JP); Kazuhiro Fukutomi, Kanagawa (JP); Shinichi Kanno, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 420 days.

(21) Appl. No.: 12/396,006

(22) Filed: Mar. 2, 2009

(65) Prior Publication Data

US 2009/0327604 A1    Dec. 31, 2009

(30) Foreign Application Priority Data

Jun. 30, 2008   (JP) .................................. 2008-171579

(51) Int. Cl.
G06F 12/16     (2006.01)
(52) U.S. Cl. ........................................ 711/114; 711/112
(58) Field of Classification Search .................... None
See application file for complete search history.

(56) References Cited

U.S. PATENT DOCUMENTS

| | | | |
|---|---|---|---|
| 7,496,811 B2 | 2/2009 | Kanno | |
| 2005/0257083 A1* | 11/2005 | Cousins | 714/6 |
| 2007/0130496 A1 | 6/2007 | Kanno | |
| 2007/0174740 A1 | 7/2007 | Kanno | |
| 2008/0010647 A1* | 1/2008 | Chapel et al. | 719/326 |
| 2008/0205145 A1 | 8/2008 | Kanno et al. | |
| 2010/0064097 A1* | 3/2010 | Iwamura et al. | 711/103 |

OTHER PUBLICATIONS

U.S. Appl. No. 12/393,654, filed Feb. 26, 2009, Fukutomi, et al.
U.S. Appl. No. 12/395,811, filed Mar. 2, 2009, Fukutomi, et al.
U.S. Appl. No. 12/398,608, filed Mar. 5, 2009, Fukutomi, et al.
U.S. Appl. No. 12/400,863, filed Mar. 10, 2009, Kanno, et al.
U.S. Appl. No. 12/404,861, filed Mar. 16, 2009, Kanno, et al.
David A Patterson, et al., "A Case for Redundant Arrays of Inexpensive Disks (RAID)", Proceedings of the 1988 ACM SIGMOD, 1988 ACM 0-89791-268-3/88/0006/0109, Jun. 1988, pp. 109-116.
U.S. Appl. No. 12/513,860, filed May 7, 2009, Nagadomi, et al.
U.S. Appl. No. 12/552,330, filed Sep. 2, 2009, Yano, et al.
U.S. Appl. No. 12/566,236, filed Sep. 24, 2009, Yano, et al.
U.S. Appl. No. 12/713,631, filed Feb. 26, 2010, Fukutomi, et al.
U.S. Appl. No. 12/883,796, filed Sep. 16, 2010, Fukutomi, et al.

* cited by examiner

Primary Examiner — Than Nguyen
(74) Attorney, Agent, or Firm — Oblon, Spivak, McClelland, Maier & Neustadt, L.L.P.

(57) ABSTRACT

A size storage unit stores therein a block size of a memory element. A buffering unit executes buffer processing configured to store data received from a RAID (Redundant Arrays of Inexpensive/Independent Disks) controller into a buffer, and to write the data stored in the buffer into the memory element. A stripe-size receiving unit receives a stripe size that indicates a size of a unit of access at time of access to the memory element by the RAID controller. Writing processing is configured to write data received from the RAID controller into the memory element without executing the buffer processing by the buffering unit, when the stripe size is n times of the block size (n is a positive integer).

10 Claims, 6 Drawing Sheets

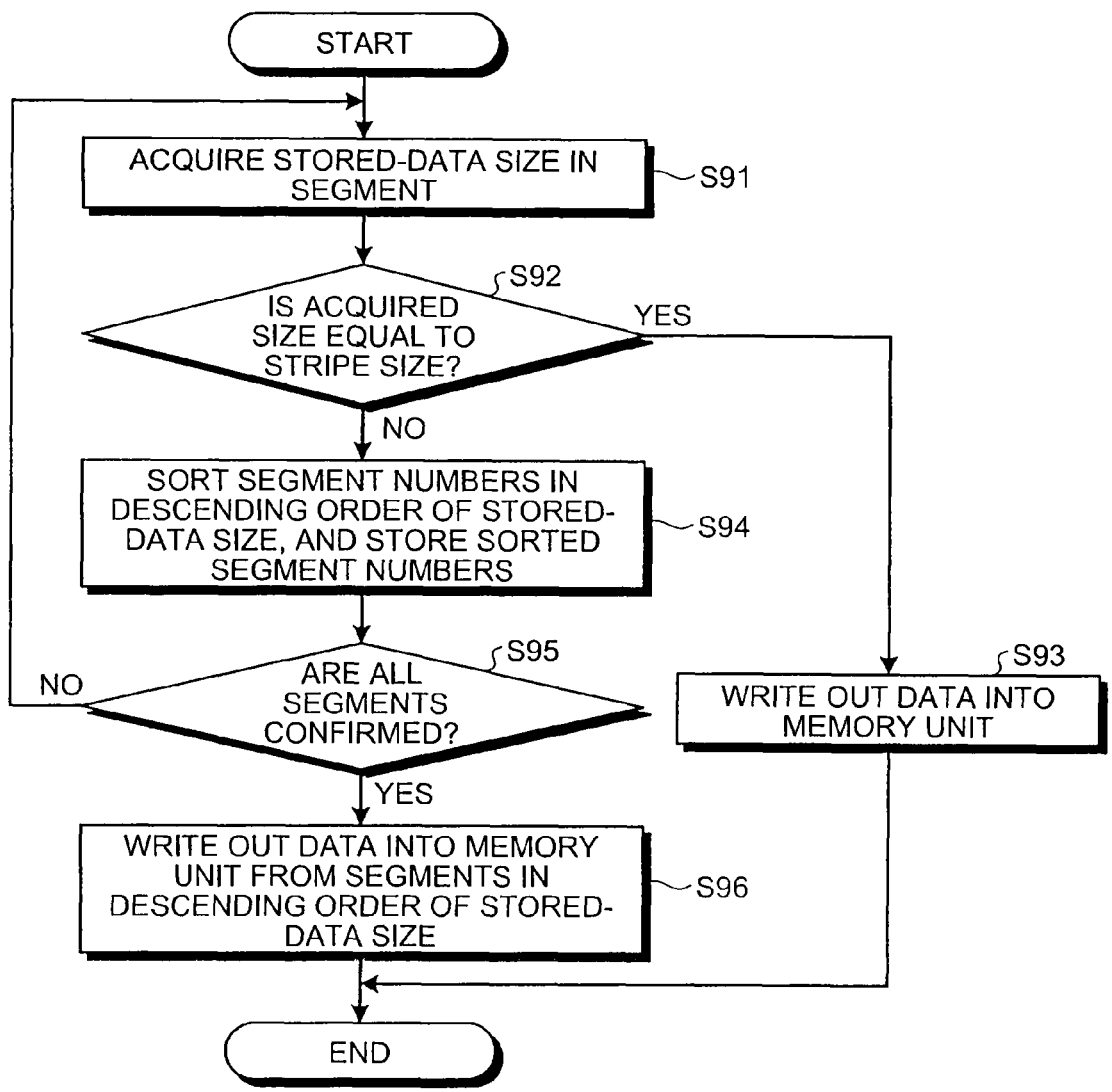

STORAGE SYSTEM AND METHOD FOR STRIPING DATA

CROSS-REFERENCE TO RELATED APPLICATIONS

This application is based upon and claims the benefit of priority from the prior Japanese Patent Application No. 2008-171579, filed on Jun. 30, 2008; the entire contents of which are incorporated herein by reference.

BACKGROUND OF THE INVENTION

1. Field of the Invention

The present invention relates to a storage device that includes a nonvolatile semiconductor memory, a control device that controls the storage device, a storage system, and a storage method.

2. Description of the Related Art

A nonvolatile semiconductor memory, such as a NAND flash memory, includes an element that writes data to be stored after once deleting data in units called block when storing data, an element that reads/writes data in units called page; and an element from/into which a unit of deletion/reading/writing is fixed. The unit of reading and writing is predetermined for each semiconductor storage device, and is one of factors on which the life and characteristics of a storage device depend.

A NAND flash memory has a character such that deterioration of memory cells (memory elements) increases along with increase in the number of times of deletion of a block that is performed prior to writing of data.

On the other hand, a unit of reading/writing of data from/into a secondary storage device, such as a hard disk, performed by a host device, such as a personal computer, is called sector. The sector is determined independently from the unit of deletion/reading/writing from/into a semiconductor memory.

For example, it is determined such that the size of a block (block size) of a semiconductor memory is 512 kilobytes, and the size of a page (page size) is four kilobytes, while the size of a sector (sector size) of a host device is 512 bytes.

To improve reliability, a storage system used in a server environment, such as disk arrays, is often configured to be included in Redundant Arrays of Independent/Inexpensive Disks (RAID), for example, as described in D. Patterson, G. Gibsonand R. Katz. "A Case for Redundant Arrays of Inexpensive Disks (RAID)", Proceedings of the 1988 ACM SIGMOD, pp. 109-116, June 1988. According to RAID, a RAID controller stores data in units called stripe into a plurality of disks. The size of a stripe (stripe size) is determined independently from a unit of reading/writing from/into a disk. Usually a magnetic storage device, such as a hard disk, is used in a storage system included in RAID; however, recently, cases of using a Solid State Drive (SSD) that uses a nonvolatile semiconductor memory as described above have increased. In such case, the stripe size is also determined independently from a unit of deletion/reading/writing from/into the nonvolatile semiconductor memory.

However, despite that there is an optimal unit of data-access against deterioration of a memory element in a storage device that uses a nonvolatile semiconductor memory as described above, such unit of access does not always agree with a unit of data-access of a host device, consequently there is a problem that memory elements cannot be efficiently used in some cases.

SUMMARY OF THE INVENTION

According to one aspect of the present invention, a storage device configured to be controlled by a control device, the storage device includes a memory element; a size storage unit that stores a block size indicating a size of a block that is a unit of access predetermined for the memory element; a data storage unit capable of storing data of a block size; a buffering unit capable of executing buffer processing configured to store data received from the control device into the data storage unit, and to write data stored in the data storage unit into the memory element; a stripe-size receiving unit that receives from the control device a stripe size indicating a size of a unit of access during access to the memory element by the control device; and a determining unit that determines whether the stripe size is n times of the block size, where n is a positive integer, wherein the buffering unit does not executes the buffer processing when the stripe size is n times of the block size.

According to another aspect of the present invention, a control device configured to control a storage device that includes a memory element of which a block size indicating a size of a block that is a unit of access is predetermined, the control device includes a request transmitting unit that transmits an acquisition request for the block size to the storage device; a block-size receiving unit that receives the block size transmitted from the storage device in response to the acquisition request; a size determining unit that determines that a stripe size indicating a size of a unit of access during access to the memory element is n times of the received block size; and a stripe-size transmitting unit that transmits the determined stripe size to the storage device.

According to still another aspect of the present invention, a storage system includes a storage device; and a control device that controls the storage device, wherein the storage device includes a memory element, a size storage unit that stores a block size indicating a size of a block that is a unit of access predetermined for the memory element, a data storage unit capable of storing data of a block size, a buffering unit capable of executing buffer processing configured to store data received from the control device into the data storage unit, and to write data stored in the data storage unit into the memory element, a request receiving unit that receives an acquisition request for the block size from the control device, a transmitting unit that acquires the block size from the size storage unit when receiving the acquisition request, and transmits the acquired block size to the control device, a stripe-size receiving unit that receives from the control device a stripe size indicating a size of a unit of access during access to the memory element by the control device, a determining unit that determines whether the stripe size is n times of the block size, where n is a positive integer, wherein the buffering unit does not executes the buffer processing when the stripe size is n times of the block size, the control device includes a request transmitting unit that transmits an acquisition request for the block size to the storage device, a block-size receiving unit that receives the block size transmitted from the storage device in response to the acquisition request, a size determining unit that determines that a stripe size indicating a size of a unit of access during access to the memory element is n times of the received block size, and a stripe-size transmitting unit that transmits the determined stripe size to the storage device.

According to still another aspect of the present invention, a storage method configured to be executed by a storage system that includes a storage device and a control device that controls the storage device, the storage device including a memory element, a size storage unit that stores a block size indicating a size of a block that is a unit of access predetermined for the memory element, a data storage unit capable of storing data of a block size, and a buffering unit capable of executing buffer processing configured to store data received from the control device into the data storage unit and to write data stored in the data storage unit into the memory element, the storage method includes transmitting an acquisition request to the storage device by the control device; receiving the acquisition request from the control device by the storage device; acquiring the block size from the size storage unit by the storage device upon receiving the acquisition request, and transmitting acquired block size to the control device; receiving the block size transmitted from the storage device in response to the acquisition request by the control device; determining by the control device that a stripe size indicating a size of a unit of access during access to the memory element is n times of received block size, where n is a positive integer; transmitting the determined stripe size to the storage device by the control device; receiving the stripe size from the control device by the storage device; determining whether the stripe size is n times of the block size by the storage device; and writing data received from the control device into the memory element by the storage device without executing the buffer processing by the buffering unit when the stripe size is n times of the block size.

BRIEF DESCRIPTION OF THE DRAWINGS

FIG. 10 is a flowchart of a general flow of cache-data transfer processing according to the embodiment.

DETAILED DESCRIPTION OF THE INVENTION

Exemplary embodiments of a storage device, a control device, a storage system, and a storage method according to the present invention will be explained below in detail with reference to the accompanying drawings.

The storage system according to an embodiment of the present invention includes a plurality of storage devices (memory devices) each of which is formed of a nonvolatile semiconductor memory, such as a NAND flash memory, and a control device (RAID controller) that forms Redundant Arrays of Independent/Inexpensive Disks (RAID) with the storage devices, and controls the RAID. The RAID controller acquires a block size of a memory element that forms each storage device from each of the storage devices, and determines that a stripe size of the RAID is a least common multiple of the acquired block sizes.

Figure 1:
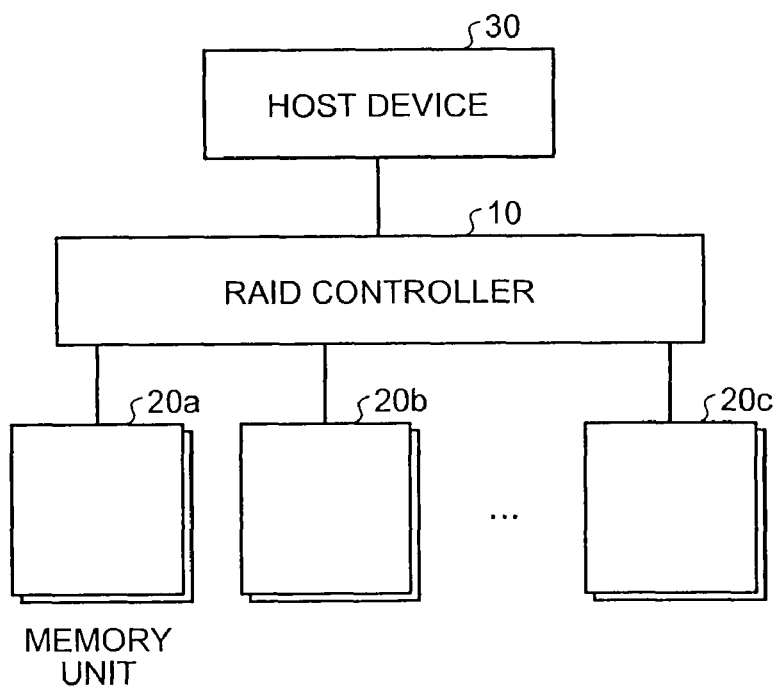
FIG. 1 is a functional block diagram of a configuration of a storage system according to an embodiment of the present invention.

FIG. 1 depicts a configuration example of the storage system when the storage system is configured as RAID. As shown in the figure, the storage system according to the embodiment includes a RAID controller 10, a plurality of memory devices 20a to 20c, and a host device 30.

The host device 30 is, for example, a personal computer (PC), and requests writing and reading of data of the RAID controller 10.

The RAID controller 10 performs control related to RAID functions, such as access in predetermined stripes. The RAID controller 10 forms RAID 5, which store data and error correcting codes into the three of the memory devices 20a to 20c in a distributed manner. Accordingly, the reliability of stored data can be enhanced.

The RAID configuration is not limited to RAID 5, and any RAID configuration can be applied as long as the RAID is configured to write data into a plurality of memory devices in predetermined stripe sizes. The control device is not limited to a RAID controller that forms RAID with a plurality of memory devices and controls the RAID, and any apparatus can be applied as long as the apparatus controls access to the memory devices so as to be performed in a predetermined size (stripe size) different from the size of a unit of access unique to each of the memory devices.

The memory devices 20a to 20c are storage devices that include memory elements that access data in blocks. The memory devices 20a to 20c are formed of, for example, Solid State Drives (SSD) each of which uses a NAND flash memory as a memory element. Hereinafter, each of the memory devices 20a to 20c is sometimes simply referred to as a memory unit 20, because they have a similar configuration. Although the figure depicts a configuration in which three of the memory devices 20 are provided, the number of the memory devices 20 to be connected is not limited to three.

Figure 2:
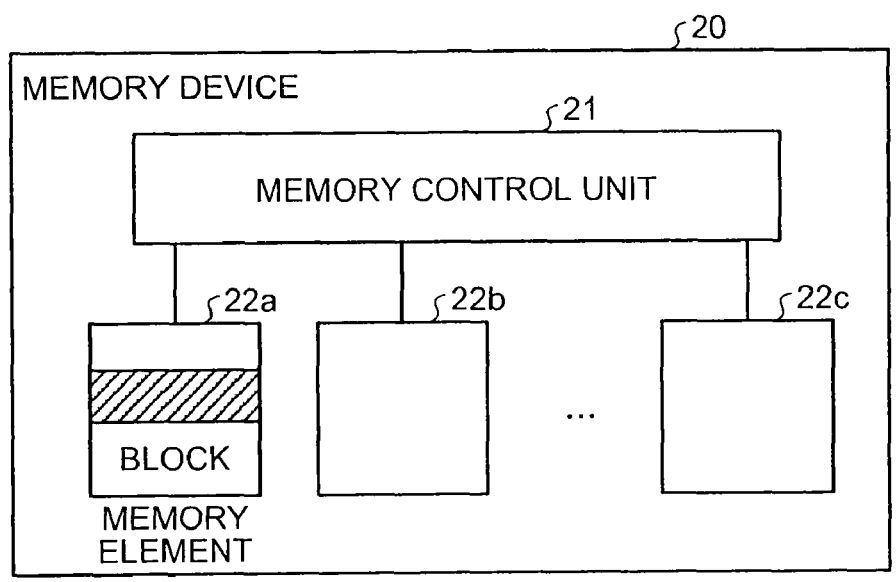
FIG. 2 is a functional block diagram of a configuration of a memory unit.

Detailed configurations of the RAID controller 10 and the memory unit 20 are explained below. A configuration of the memory unit 20 is explained below at first, with reference to FIG. 2. As shown in the figure, the memory unit 20 includes a memory control unit 21 and memory elements 22a to 22c.

The memory elements 22a to 22c access data in blocks of a predetermined size (block size). The memory elements 22a to 22c can be formed of, for example, a NAND flash memory. Applicable elements are not limited to a NAND flash memory, and any memory element can be applied as long as the element accesses data in predetermined block sizes.

Hereinafter, each of the memory elements 22a to 22c is sometimes simply referred to as a memory element 22, because they have a similar configuration. Although the figure depicts a configuration example in which three of the memory elements 22 are provided, the number of the memory elements 22 is not limited to three.

Figure 3:
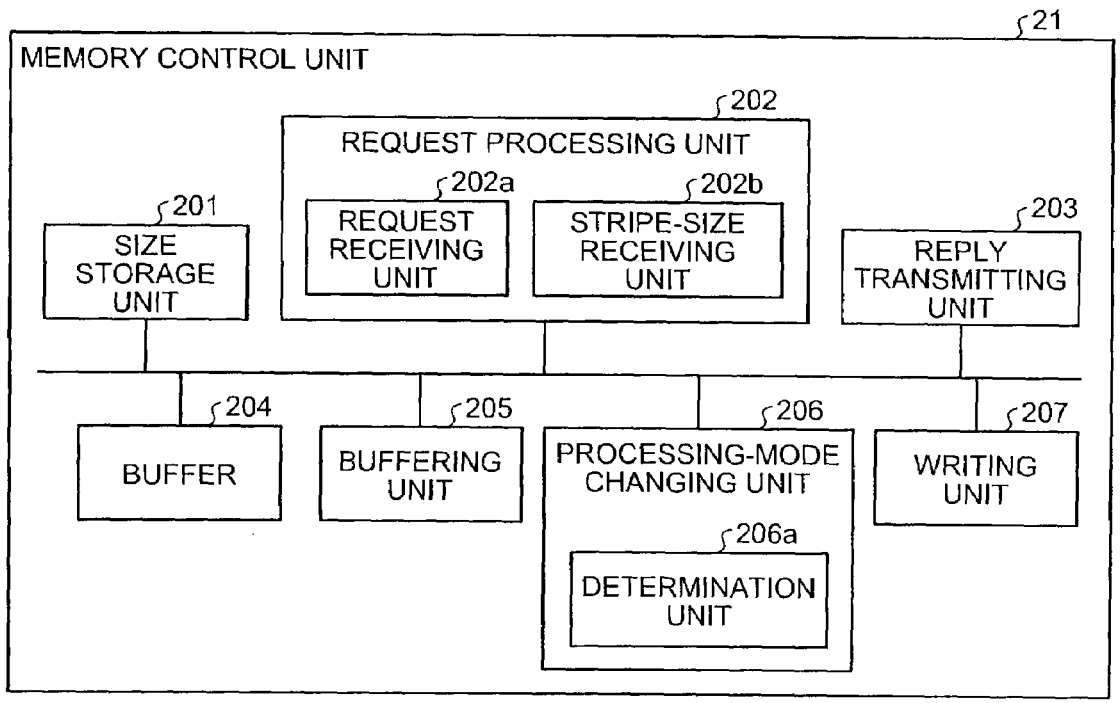
FIG. 3 is a functional block diagram of a detailed configuration of a memory control unit.

The memory control unit 21 controls access to the memory element 22 by processing a command from the RAID controller 10. As shown in FIG. 3, the memory control unit 21 includes a size storage unit 201, a request processing unit 202, a reply transmitting unit 203, a buffer 204, a buffering unit 205, a processing-mode changing unit 206, and a writing unit 207.

The size storage unit 201 stores therein a block size that is a unit of access to each of the memory elements 22 of the memory devices 20. The size storage unit 201 can store only one block size, or can store a plurality of block sizes, for example, a block size at time of reading-writing (reading-writing block size), and a block size at time of deletion (deletion block size).

The request processing unit 202 receives various requests and data from the RAID controller 10, and executes processing in accordance with received requests and data. For example, the request processing unit 202 receives a request for reading-writing of data from the RAID controller 10, and executes reading-writing of data from/into the memory element 22 in accordance with the request.

The request processing unit 202 includes a request receiving unit 202a and a stripe-size receiving unit 202b as a more detailed configuration.

The request receiving unit 202a receives various requests, such as an acquisition request for a block size, from the RAID controller 10. The stripe-size receiving unit 202b receives a stripe size determined by the RAID controller 10 from the RAID controller 10.

Furthermore, the request processing unit 202 acquires a block size from the size storage unit 201 in accordance with the acquisition request received by the request receiving unit 202a.

The reply transmitting unit 203 transmits the block size received by the request processing unit 202 to the RAID controller 10.

The buffer 204 temporarily stores therein data of which writing is requested by the RAID controller 10. The buffer 204 can store therein at least a block size of data.

The buffering unit 205 performs buffer processing during access to the memory element 22 by using the buffer 204. The buffer processing is configured to store data in a smaller size than a block size of the memory element 22 into the buffer 204, and to write stored data into the memory element 22 when the data reaches the block size.

The processing-mode changing unit 206 sets and changes a processing mode of the writing unit 207, which will be described later. The processing mode include a normal mode, in which the buffering unit 205 executes buffer processing, and a fast processing mode, in which data received from the RAID controller 10 is directly written into the memory element 22 without executing buffer processing.

The processing-mode changing unit 206 includes a determination unit 206a that determines whether a stripe size received from the RAID controller 10 is equal to or an integral multiple of a block size of the memory element 22. When the stripe size is equal to or an integral multiple of the block size, the processing-mode changing unit 206 sets the processing mode to the fast processing mode.

For example, in a case of the memory unit 20 of which block size is two kilobytes (KB), the processing-mode changing unit 206 is configured to be capable to shift the processing mode to the fast processing mode when the stripe size is equal to two KB or an integral multiple of two KB (four KB, eight KB, or the like). Because, when the condition is satisfied, data is consistently written in block sizes even if buffering (buffer processing) by the buffering unit 205 is omitted.

The writing unit 207 writes data into the memory element 22 in the processing mode that is set or changed by the processing-mode changing unit 206. For example, in a case of the normal mode, the writing unit 207 stores data received from the RAID controller 10 into the buffer 204 by executing buffer processing by the buffering unit 205, and writes the data stored in the buffer 204 into the memory element 22.

By contrast, in a case of the fast processing mode, the writing unit 207 does not executes buffer processing by the buffering unit 205, and writes data received from the RAID controller 10 directly into the memory element 22.

Figure 4:
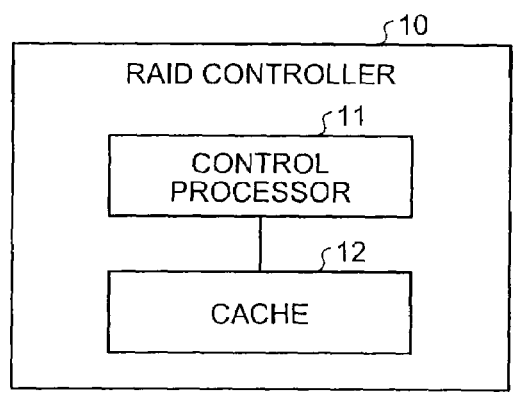
FIG. 4 is a functional block diagram of a configuration of a RAID (Redundant Arrays of Independent/Inexpensive Disks) controller shown in FIG. 1.

A configuration of the RAID controller 10 is explained below with reference to FIG. 4. As shown in the figure, the RAID controller 10 includes a control processor 11 and a cache 12.

The cache 12 is a storage unit that can temporarily store data that is to be written into the memory unit 20. The cache 12 can be configured by using a volatile semiconductor, such as a Dynamic Random Access Memory (DRAM).

Figure 5:
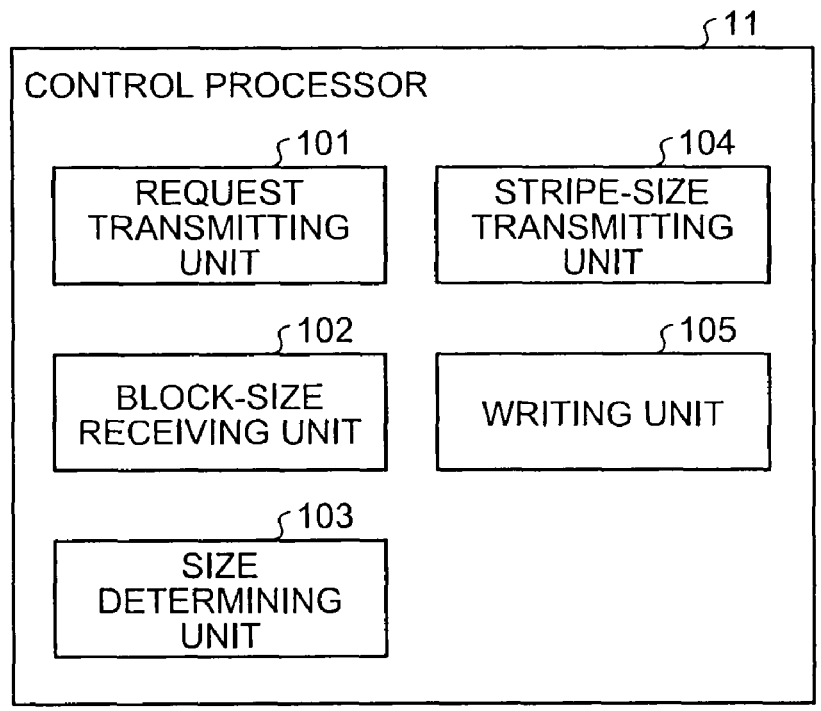
FIG. 5 is a functional block diagram of a functional configuration of a control processor.

The control processor 11 performs reading-writing of data in stripes, or creation of data for error correction. As shown in FIG. 5, the control processor 11 includes a request transmitting unit 101, a block-size receiving unit 102, a size determining unit 103, a stripe-size transmitting unit 104, and a writing unit 105.

The request transmitting unit 101 transmits an acquisition request for a block size to the memory unit 20. The request transmitting unit 101 transmits an acquisition, for example, when the memory unit 20 is connected to the RAID controller 10, and configuration processing in which the connected memory unit 20 is to be included in RAID is started.

The block-size receiving unit 102 receives a block size transmitted from each of the memory devices 20 in response to the acquisition request for a block size.

Based on the block size received from each of the memory devices 20, the size determining unit 103 determines a stripe size that is a size of a unit of access to each of the memory devices 20 that constitute the RAID. Specifically, the size determining unit 103 determines a stripe size so as to be n times (n is a positive integer) of the block size of each of the memory devices 20.

For example, when block sizes of the memory devices 20 all agree with each other, the size determining unit 103 determines that the received block size is the stripe size (n=1). By contrast, for example, when the block sizes of the memory devices 20 do not agree with each other, the size determining unit 103 determines that a least common multiple of the received block sizes is the stripe size.

It can be configured such that a threshold value as the upper limit of the least common multiple is predetermined, and the size determining unit 103 determines a least common multiple to be the stripe size within a range not exceeding the threshold value. For example, it is configured such that the size determining unit 103 obtains a least common multiple of all of the received block sizes, and if the obtained least common multiple exceeds the threshold value, the size determining unit 103 obtains a least common multiple that is the least common multiple of the rest of the block sizes excluding one block size from the received block sizes, and does not exceed the threshold value.

The stripe-size transmitting unit 104 transmits the stripe size determined by the size determining unit 103 to each of the memory devices 20.

The writing unit 105 executes writing processing of writing data into each of the memory devices 20 in the determined stripe size. The writing unit 105 executes buffer processing by using the cache 12, and writes data into the memory unit 20, similarly to the writing unit 207 of the memory unit 20.

Figure 6:
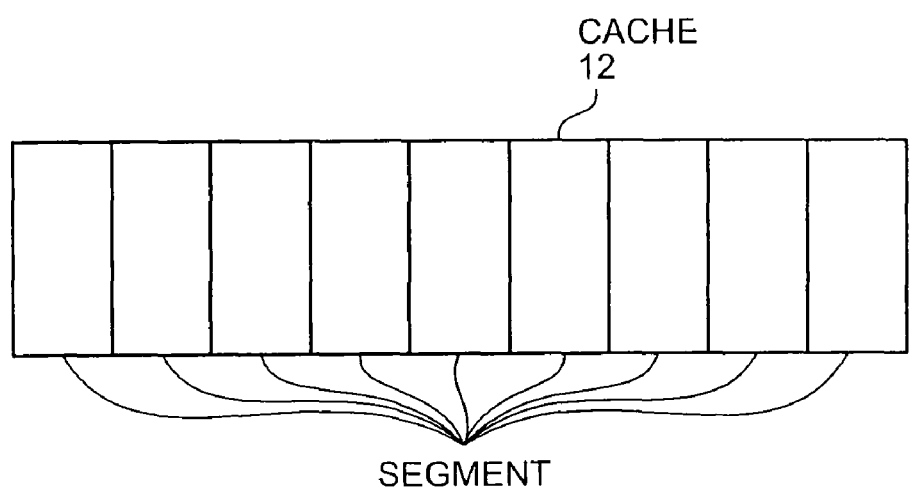
FIG. 6 is a schematic diagram illustrating an example that a cache is divided into segments.

Specifically, the writing unit 105 manages the cache 12 by dividing the cache 12 into a plurality of segments delimited in stripe sizes. The writing unit 105 temporarily stores writing data from the host device 30 into each of segments that are divided as shown in FIG. 6, and when stored data reaches the stripe size that is the capacity of a segment, the writing unit 105 writes the data stored in the segment into the memory unit 20.

When free space in the cache 12 becomes insufficient, to ensure free space, the writing unit 105 writes out data in a segment in which a data size is less than the stripe size. According to the embodiment, in such case, the writing unit 105 writes out to the memory unit 20 preferentially from data of which size is as close as possible to the stripe size. Accordingly, effective data written into one block of the memory unit 20 becomes large, so that a writing transfer rate can be improved.

Stripe-size determination processing performed by the storage system according to the embodiment configured as described above is explained below with reference to FIG. 7.

To begin with, the request transmitting unit 101 of the RAID controller 10 transmits an acquisition request for a block size to the memory unit 20 that is connected to the RAID controller 10 (Step S41). The memory unit 20 then executes size-acquisition/reply processing of acquiring a block size from the size storage unit 201 and replying (Step S42). Details of the size-acquisition/reply processing will be described later. The block-size receiving unit 102 of the RAID controller 10 receives the block size replied from the memory unit 20.

When a plurality of the memory devices 20 are connected, the RAID controller 10 repeatedly performs the above processing on all of the memory devices 20, and acquire respective block sizes from the memory devices 20. If the memory devices 20 connected to the RAID controller 10 are all the same, all of the acquired block sizes are the same; however, if the memory devices 20 that are different are connected, the acquired block sizes may vary in some cases.

The size determining unit 103 of the RAID controller 10 determines an appropriate stripe size from the received block sizes (Step S43). Specifically, the size determining unit 103 determines that a least common multiple of block sizes of all of the memory devices 20 is the stripe size. For example, if the storage system includes three of the memory devices 20 having respective block sizes, namely, one KB, two KB, and four KB; the size determining unit 103 determines that the stripe size is four KB.

The stripe-size transmitting unit 104 of the RAID controller 10 notifies all of the memory devices 20 of the determined stripe size (Step S44). The memory unit 20 then executes processing-mode setting processing of setting a processing mode in accordance with the received stripe size (Step S45). Details of the processing-mode setting processing will be described later.

After the processing-mode setting processing, each of the memory devices 20 transmits completion of the processing-mode setting processing to the RAID controller 10 (Step S46). After that, the RAID controller 10 makes access to the memory devices 20 in accordance with the determined stripe size (Step S47).

Figure 8:
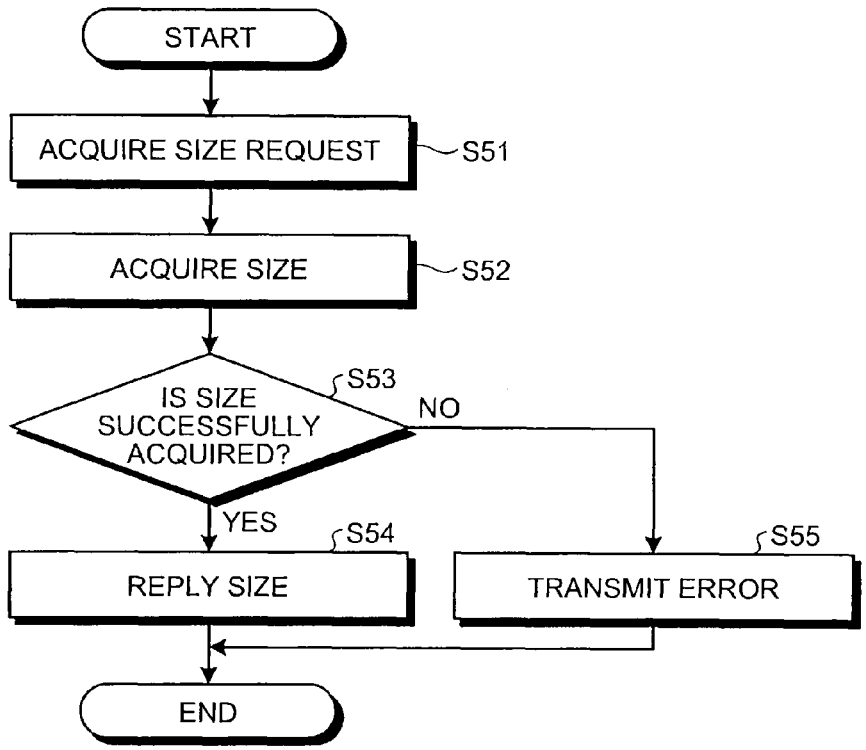
FIG. 8 is a flowchart of a general flow of size-acquisition/reply processing.

Details of the size-acquisition/reply processing at Step S42 are explained below with reference to FIG. 8.

To begin with, the request receiving unit 202a of the memory unit 20 acquires an acquisition request for a block size from the RAID controller 10 (Step S51). The request processing unit 202 receives a block size to be used for access to the memory element 22 from the size storage unit 201 (Step S52). The request processing unit 202 determines whether the acquired block size is successfully acquired (Step S53). If it is successfully acquired (Yes at Step S53), the reply transmitting unit 203 replies the acquired block size to the RAID controller 10 (Step S54).

When a plurality of block sizes is stored in the size storage unit 201, the request processing unit 202 determines a block size to be replied, for example, by giving a priority to one of the block sizes. Alternatively, it can be configured such that the request processing unit 202 determines that a least common multiple of the block sizes is the block size to be replied.

By contrast, if the block size is not successfully acquired (No at Step S53), the reply transmitting unit 203 replies an error to the RAID controller 10 (Step S55).

Figure 9:
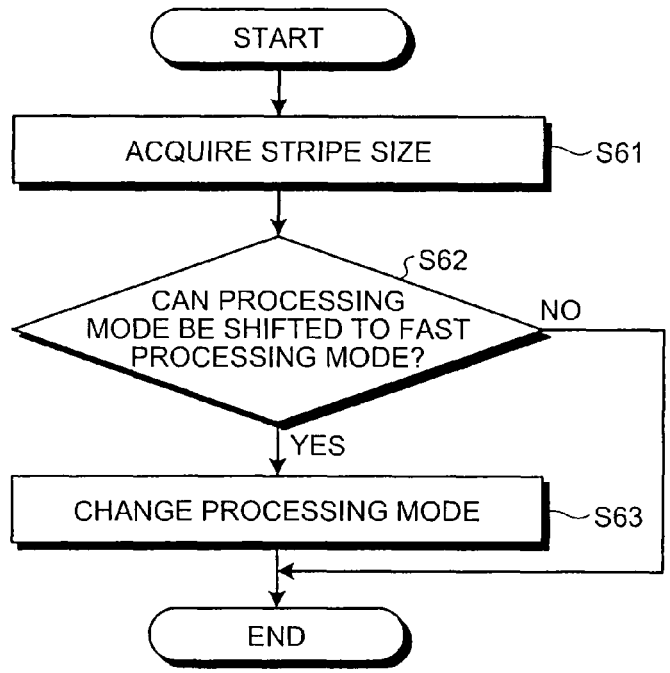
FIG. 9 is a flowchart of a general flow of processing-mode setting processing.

Details of the processing-mode setting processing at Step S45 are explained below with reference to FIG. 9.

To begin with, the stripe-size receiving unit 202b receives a stripe size from the RAID controller 10 (Step S61). The determination unit 206a then determines whether the processing mode can be shifted to the fast processing mode in which buffer processing is not performed, by acquiring a block size from the size storage unit 201 and comparing the block size with the stripe size (Step S62). Specifically, the determination unit 206a determines that the processing mode can be shifted to the fast processing mode when the received stripe size is equal to or an integral multiple of the block size.

If the processing mode can be shifted to the fast processing mode (Yes at Step S62), the processing-mode changing unit 206 changes the processing mode to the fast processing mode in which buffer processing performed by the buffering unit 205 is stopped (Step S63). By contrast, if the processing mode can not be shifted to the fast processing mode (No at Step S62), the processing-mode changing unit 206 does not change the processing mode, and the processing-mode setting processing is terminated.

According to the example shown in the figure, it is assumed that the processing mode is set in the normal mode in advance. However, it can be configured such that the processing-mode changing unit 206 sets the processing mode to either the normal mode or the fast processing mode in accordance with a determination result.

Alternatively, instead of setting and changing the processing mode by determining the processing mode by the memory unit 20, it can be configured such that the RAID controller 10 transmits, for example, a shift command for changing the processing mode, and the memory unit 20 sets and changes the processing mode in accordance with the received command.

Figure 7:
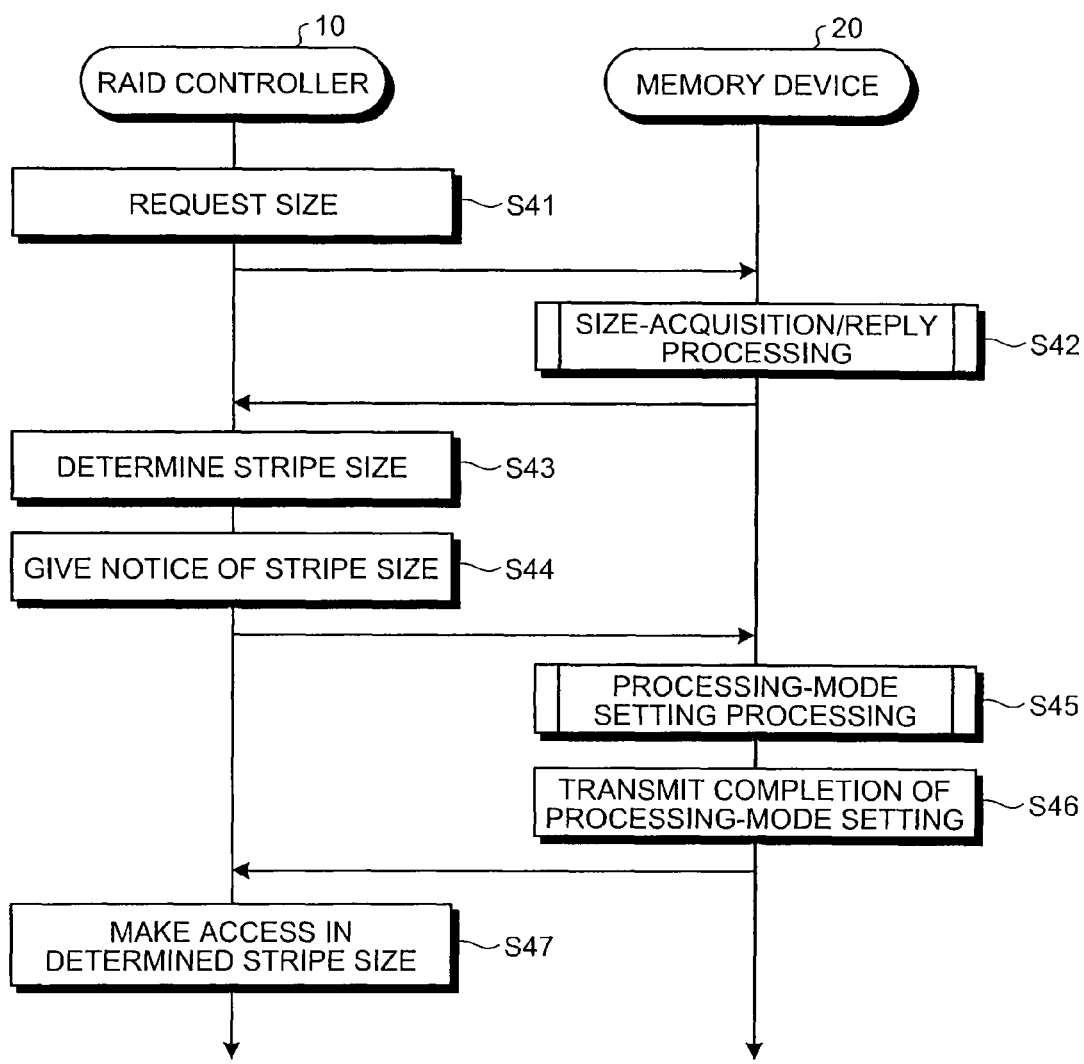
FIG. 7 is a sequence diagram of a general flow of stripe-size determination processing according to the embodiment.

As explained in FIG. 7, after the stripe-size determination processing, the RAID controller 10 turns capable to gain access to the memory unit 20 in accordance with the determined stripe size. Data writing processing into the memory unit 20 performed by the RAID controller 10 is explained below.

The writing unit 105 of the control processor 11 writes data into a segment corresponding to a logical address of a writing destination specified by the host device 30 among the segments divided from the cache 12 as shown in FIG. 6, and replies to the host device 30 that the writing is completed.

Cache-data transfer processing, in which cache data is transferred to the memory unit 20 upon lack of free space in the cache 12 due to repetitions of data writing processing, is explained below with reference to FIG. 10.

To begin with, the writing unit 105 of the control processor 11 acquires a size of data stored in one segment (stored-data size) among the segments divided from the cache 12 as shown in FIG. 6 (Step S91). The writing unit 105 then determines whether the acquired stored-data size and the stripe size are equal (Step S92). If they are equal (Yes at Step S92), the writing unit 105 writes out the data in the segment into the memory unit 20 (Step S93).

By contrast, if the acquired stored-data size and the stripe size are not equal (No at Step S92), the writing unit 105 stores information about the segment in a sorted manner in descending order of stored-data size (Step S94). For example, the writing unit 105 sorts segment numbers each of which identifies a segment in descending order of stored-data size, and stores the sorted segment numbers in a not-shown storage unit.

The writing unit 105 then determines whether stored-data sizes of all segments are confirmed, for example, by referring to the number of segments that is determined when dividing the cache 12 (Step S95). If not all segments are confirmed (No at Step S95), the writing unit 105 repeats the processing by confirming a stored-data size of an unconfirmed segment (Step S91).

By contrast, if all segments are confirmed (Yes at Step S95), the writing unit 105 refers information about the segments that is sorted and stored, and writes out data into the memory unit 20 from segments in descending order of stored-data size (Step S96).

According to the processing in this way, effective data to be written into one block of the memory unit 20 becomes large in size, so that a writing transfer rate from/into the memory element 22 can be improved. Moreover, the processing results in a delay of writing-out of data from a segment in which a stored-data size is small, thereby increasing a possibility that the stored-data size in the segment is increased because of another writing request in the meantime. Accordingly, it can be expected that the writing transfer rate from/into the memory element 22 is to be further improved.

As described above, the storage system according to the embodiment, the control device that controls the storage devices acquires from each of the storage devices a size of an optimal unit of access to a nonvolatile semiconductor memory included in the storage device, and determines that a size of a unit of access at time of access to the storage device by the control device is equal to or n times of the acquired block size.

Accordingly, efficiency of writing/deletion into/from the memory elements of the storage devices is improved, and the life of the memory elements can be extended. Moreover, the processing of summing up data within the storage device by buffer processing is not needed, consequently, the writing processing can become faster.

The functions described above configured to be executed by the memory control unit of the storage devices (memory devices) according to the embodiment and the control processor of the control device (RAID controller) according to the embodiment can be provided as computer programs. Each of the computer programs is provided by being incorporated in, for example, a Read Only Memory (ROM), in advance.

Moreover, each of the computer programs can be recorded in a file in an installable format or an executable format onto a computer-readable recording medium, such as a Compact Disk Read Only Memory (CD-ROM), a Flexible Disk (FD), a Compact Disk Recordable (CD-R), or a Digital Versatile Disk (DVD), and then provided.

The computer programs to be executed by the storage device according to the embodiment has a module configuration that includes the units described above (namely, the request processing unit, the reply transmitting unit, the buffering unit, the processing-mode changing unit, and the writing unit). Practical hardware is configured such that as a Central Processing Unit (CPU) reads the computer programs from the ROM and executes the programs, each of the units is loaded on a main memory, and each of the units is created on the main memory.

Furthermore, the computer programs to be executed by the control device according to the embodiment has a module configuration that includes the units described above (namely, the request transmitting unit, the block-size receiving unit, the size determining unit, the stripe-size transmitting unit, and the writing unit). Practical hardware is configured such that as the CPU (the control processor) reads the computer programs from the ROM and executes the programs, each of the units is loaded on a main memory, and each of the units is created on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage device configured to be controlled by a control device, the storage device comprising:
a memory element;
a size storage unit that stores a block size indicating a size of a block that is a unit of access predetermined for the memory element;
a data storage unit capable of storing data of a block size;
a buffering unit capable of executing buffer processing configured to store data received from the control device into the data storage unit, and to write data stored in the data storage unit into the memory element;
a stripe-size receiving unit that receives from the control device a stripe size indicating a size of a unit of access during access to the memory element by the control device; and
a determining unit that determines whether the stripe size is n times of the block size, where n is a positive integer, wherein
the buffering unit does not executes the buffer processing when the stripe size is n times of the block size.

2. The device according to claim 1, further comprising:
a request processing unit that receives an acquisition request for the block size from the control device, and acquires the block size from the size storage unit in accordance with received acquisition request; and
a transmitting unit that transmits the acquired block size to the control device, wherein
the stripe-size receiving unit receives the stripe size transmitted from the control device in accordance with transmitted block size.

3. The device according to claim 2, wherein
the size storage unit stores at least one of a reading-writing block size and a deletion block size, the reading-writing block size indicating a size of a block that is a unit of access during data reading-writing predetermined for the memory element, and the deletion block size indicating a size of a block that is a unit of access at data deletion predetermined for the memory element,
the request processing unit acquires one of the reading-writing block size and the deletion block size from the size storage unit upon receiving the acquisition request, and
the transmitting unit transmits one of the acquired reading-writing block size and acquired deletion block size to the control device.

4. The device according to claim 2, wherein
the size storage unit stores a reading-writing block size and a deletion block size, the reading-writing block size indicating a size of a block that is a unit of access during data reading-writing predetermined for the memory element, and the deletion block size indicating a size of a block that is a unit of access at data deletion predetermined for the memory element, the request processing unit acquires the reading-writing block size and the deletion block size from the size storage unit upon receiving the acquisition request, and obtains a least common multiple of the acquired reading-writing block size and deletion block size, and the transmitting unit transmits the obtained least common multiple to the control device as a block size.

5. A control device configured to control a storage device that includes a memory element of which a block size indicating a size of a block that is a unit of access is predetermined, the control device comprising:
   a request transmitting unit that transmits an acquisition request for the block size to the storage device;
   a block-size receiving unit that receives the block size transmitted from the storage device in response to the acquisition request;
   a size determining unit that determines that a stripe size indicating a size of a unit of access during access to the memory element is n times of the received block size; and
   a stripe-size transmitting unit that transmits the determined stripe size to the storage device.

6. The device according to claim 5, wherein
   the request transmitting unit transmits the acquisition request to a plurality of storage devices,
   the block-size receiving unit receives the block size from each of the storage devices, and
   the size determining unit obtains a least common multiple of a plurality of block sizes received from the storage devices, and determines that the obtained least common multiple is the stripe size.

7. The device according to claim 6, wherein the size determining unit obtains a least common multiple of more than two block sizes of which least common multiple becomes equal to or lower than a threshold value from among the block sizes received from the storage devices, and determines that the obtained least common multiple is the stripe size.

8. The device according to claim 5, further comprising:
   a plurality of data storage units capable of storing data that is to be written into the memory element; and
   a writing unit that preferentially writes data of a large size among data stored in the data storage units into the storage device.

9. A storage system comprising:
   a storage device; and
   a control device that controls the storage device, wherein
   the storage device includes
   a memory element,
   a size storage unit that stores a block size indicating a size of a block that is a unit of access predetermined for the memory element,
   a data storage unit capable of storing data of a block size,
   a buffering unit capable of executing buffer processing configured to store data received from the control device into the data storage unit, and to write data stored in the data storage unit into the memory element,
   a request receiving unit that receives an acquisition request for the block size from the control device,
   a transmitting unit that acquires the block size from the size storage unit when receiving the acquisition request, and transmits the acquired block size to the control device,
   a stripe-size receiving unit that receives from the control device a stripe size indicating a size of a unit of access during access to the memory element by the control device,
   a determining unit that determines whether the stripe size is n times of the block size, where n is a positive integer, wherein
   the buffering unit does not executes the buffer processing when the stripe size is n times of the block size,
   the control device includes
   a request transmitting unit that transmits an acquisition request for the block size to the storage device,
   a block-size receiving unit that receives the block size transmitted from the storage device in response to the acquisition request,
   a size determining unit that determines that a stripe size indicating a size of a unit of access during access to the memory element is n times of the received block size, and
   a stripe-size transmitting unit that transmits the determined stripe size to the storage device.

10. A storage method configured to be executed by a storage system that includes a storage device and a control device that controls the storage device, the storage device including a memory element, a size storage unit that stores a block size indicating a size of a block that is a unit of access predetermined for the memory element, a data storage unit capable of storing data of a block size, and a buffering unit capable of executing buffer processing configured to store data received from the control device into the data storage unit and to write data stored in the data storage unit into the memory element, the storage method comprising:
    transmitting an acquisition request to the storage device by the control device;
    receiving the acquisition request from the control device by the storage device;
    acquiring the block size from the size storage unit by the storage device upon receiving the acquisition request, and transmitting acquired block size to the control device;
    receiving the block size transmitted from the storage device in response to the acquisition request by the control device;
    determining by the control device that a stripe size indicating a size of a unit of access during access to the memory element is n times of received block size, where n is a positive integer;
    transmitting the determined stripe size to the storage device by the control device;
    receiving the stripe size from the control device by the storage device;
    determining whether the stripe size is n times of the block size by the storage device; and
    writing data received from the control device into the memory element by the storage device without executing the buffer processing by the buffering unit when the stripe size is n times of the block size.

* * * * *